Patented Apr. 22, 1947

2,419,286

UNITED STATES PATENT OFFICE 2,419,286

PROCESS OF MAKING FERMENTED JUICE PRODUCT

William A. Rooker, Winchester, Va., assignor to National Fruit Products Company, Inc., Winchester, Va., a corporation of Virginia No Drawing. Application December 4, 1944, Serial No. 566,639

17 Claims. (Cl. 99—34)

My invention relates to an improved fermented juice product and process of making the same.

The aroma or bouquet of a natural, fresh, fruit juice is due to the presence therein of certain volatile substances, generally referred to as aromatics. When such a fruit juice is subjected to fermentation, the aromatics break down, are modified or changed, and are probably carried off, in part, by the carbon dioxide escaping from the juice during fermentation and thereby lost. Because of this, the bouquet of a fermented juice is quite different from that of the natural, fresh, unfermented juice. When such a fermented juice is subjected to distillation or concentration, as in the manufacture of brandy, there is a further breakdown and loss of aromatics, resulting in a pronounced alteration or change in the bouquet. For these reasons, there has been no fermented juice product made, up to this time, that has the aroma or bouquet of the natural, fresh, unfermented fruit juice from which the product is made.

One object of my invention is to provide a fermented juice product, which has the aroma or bouquet of the natural juice from which the product is made.

Another object of my invention is to provide a process for making a fermented juice product, which is such as to give a product that has the aroma or bouquet of the unfermented juice from which the product is made.

Further objects, and objects relating to details and economies of operation, will definitely appear from the detailed description to follow. In one instance, I have accomplished the objects of my invention by the devices and means described herein. My invention is clearly defined and pointed out in the appended claims.

In general, the process of my invention comprises, first, expressing the juice from fruit, then, distilling the aromatics from the juice and collecting them, next, subjecting the juice remaining after distillation of the aromatics to fermentation and, finally, recombining the aromatics distilled off with the fermented juice, after the fermentation has ceased. The aromatics will be distilled off from the fruit juice accompanied by a certain amount of water and they may be condensed by redistillation or fractionation. If from one (1%) percent to five (5%) percent of the volume of the unfermented fruit juice be distilled off, it will be found that the aromatics have been removed therefrom. As many of the aromatics are broken down by excessive heat, the distillation of the aromatics from the unfermented fruit juice should be carried on under such conditions as not to break down the aromatics. In some cases, this can be effected by distillation at a controlled temperature under atmospheric pressure, but, in other cases, the distillation should be effected at subatmospheric pressure in order to reduce the temperature of distillation. The pressure and the temperatures to be employed in the distillation step will be determined by the particular aromatics included in the fruit juice under distillation. In the case of apple juice, the aromatics can be removed without breaking them down by a flash distillation. The aromatics will be recombined with the fermented juice by mixing thoroughly with said juice the condensate from the distilling step.

One application of my process is to the production of a cider vinegar which will have the bouquet of the fresh cider from which the vinegar is made. To accomplish this, the cider is first expressed from the apples, which have previously been prepared in the usual manner. This cider is, then, subjected to distillation to distil off from one (1%) percent to five (5%) percent of its original volume. Practically all of the aromatics, that give the bouquet to fresh cider, will be carried off by this distillation. It is important that it be carried out under such conditions as not to break down the aromatics and one way to effect this is by a flash distillation. The cider is heated to about 320° F. in three seconds while kept under a pressure of 75 pounds per square inch and the superheated liquid is then suddenly released into a chamber, which is at atmospheric pressure. The vapors which are distilled off in this operation may then be carried through a fractionating column and the vapors coming from the fractionating column are condensed and collected. This condensate consists of a concentrated solution of the aromatics that were originally present in the cider. The cider, remaining behind after distillation of the aromatics therefrom, is then subjected to the usual alcoholic fermentation, customarily employed in the manufacture of cider vinegar, and it is then subjected to the usual acetic fermentation. In other words, the cider remaining behind after distilling off the aromatics is subjected to the usual steps employed in the manufacture of cider vinegar. When these steps are complete, and all fermentation has ceased, the condensed aromatics are recombined with the vinegar by mixing thoroughly therewith. The proportion, in which the condensed aromatics will be added to the vinegar, will depend of course upon the concentration of the aromatics but, in general, the aromatics should be added in such quantity that the cider vinegar will have substantially the same proportion of aromatics as the fresh cider from which it was made. Of course, where desired, the bouquet of the cider vinegar may be strengthened or weakened, by increasing or decreasing the proportion in which the condensed aromatics are recombined therewith. This process gives a new product, that is to say, a cider vinegar which has the aroma or bouquet of the fresh cider from which such vinegar was made. It contains all the aromatics of the fresh cider, unmodified and uncontaminated by fermentation.

This process is also applicable to the production of wines or champagnes, that will have the bouquet of the fresh fruit juices from which they are made. The juice is first expressed from the fruit and the expressed fruit juice is then subjected to distillation to distil off from one (1%) percent to five (5%) percent of the original volume. This distillation must be conducted under such conditions, and so controlled, as not to break down the aromatics. The vapors resulting from this distillation are then condensed and will consist of an aqueous solution of the aromatics that impart the bouquet to the natural fruit juice. If desired, this solution of aromatics may be put in more concentrated form by redistillation or fractionation. The condensate consisting of the aqueous solution of aromatics is, then, preserved for subsequent use in the process. The remaining juice, from which the aromatics have been driven off, is then subjected to the usual alcoholic fermentation and to the other steps customarily employed to produce a wine or champagne of the type that is to be made. After all fermentation has ceased and after the wine has aged, the condensed aromatics are recombined with the fermented juice, in such proportion as to give the fermented juice the same bouquet as the fresh juice from which it was made. The condensed aromatics may be mixed into the fermented juice after ageing and before bottling, or they may be added at the time the wine is bottled. This process results in a new product, that is to say, a wine or champagne which has the same bouquet as the fresh, unfermented juice from which it is made.

This process is also applicable to the production of a brandy that will have the aroma and bouquet of the fruit juice from which it is made. In such case, the juice is first expressed from the fruit in the usual manner. This fruit juice is then subjected to a distillation, under conditions such as not to break down the aromatics, to distil off from one (1%) percent to five (5%) percent of the original volume of the juice. In making apple brandy, this distillation may be a flash distillation, such as described in connection with the manufacture of cider vinegar. The vapors distilled off and condensed consist of an aqueous solution of the aromatics that impart the bouquet to the fresh, unfermented fruit juice. This solution of aromatics is then concentrated by redistillation or fractionation, and the condensed aromatics are preserved for subsequent reuse. The fruit juice remaining after the aromatics have been distilled off is, then, subjected to the usual alcoholic fermentation and the fermented juice is then distilled. The condensate from this distilling operation is then subjected to the usual finishing and ageing operations, such as are customarily performed in the manufacture of brandy. After all fermentation has ceased, and after the brandy has been aged and just before bottling, the condensed aromatics are recombined with the brandy by mixing thoroughly therewith. If desired, this may be done at the time the brandy is bottled. This process results in a new product, that is to say, a brandy having all of the aroma and bouquet of the fresh, unfermented fruit juice from which it is made.

Wherever, in the specification and claims, I have referred to "fruit" or "fruit juice," I mean to include therein berries and berry juice. By the term "aromatics," I refer to those volatile substances of varied nature, which impart the aroma or bouquet to the natural fruit juice.

I am aware that the product and process described herein are subject to considerable variation without departing from the spirit of my invention and, therefore, I claim my invention broadly as indicated by the appended claims.

Having thus described my invention, what I claim as new and useful, and desire to secure by Letters Patent, is:

1. The process of making a fermented juice product comprising expressing the juice from fruit, distilling the aromatics from the juice, subjecting the juice to fermentation, and recombining the aromatics distilled off with the fermented juice after fermentation has ceased.

2. The process of making a fermented juice product comprising expressing the juice from fruit, distilling the aromatics from the juice, condensing said aromatics, subjecting the remaining juice to fermentation, and recombining the condensed aromatics with the fermented juice after fermentation has ceased.

3. The process of making a fermented juice product comprising expressing the juice from fruit, distilling off from 1% to 5% of the volume of the juice to remove the aromatics therefrom, subjecting the remaining juice to fermentation, and recombining said aromatics with the fermented juice after fermentation has ceased.

4. The process of making a fermented juice product comprising expressing the juice from fruit, distilling the aromatics from the juice under mild heat conditions such as not to break down the aromatics, subjecting the remaining juice to fermentation, and recombining the unmodified aromatics of the juice with the fermented juice after fermentation has ceased.

5. The process of making a fermented juice product comprising expressing the juice from fruit, subjecting the juice to a flash distillation to remove the aromatics therefrom, subjecting the remaining juice to fermentation, and recombining the aromatics distilled off with the fermented juice after fermentation has ceased.

6. The process of making cider vinegar comprising expressing cider from apples, distilling the aromatics from the cider, subjecting the cider to alcoholic fermentation, then subjecting it to acetic fermentation, and recombining the aromatics distilled off with the fermented cider after all fermentation has ceased.

7. The process of making cider vinegar comprising expressing cider from apples, distilling the aromatics from the cider, condensing said aromatics, subjecting the remaining cider to alcoholic fermentation, then subjecting it to acetic fermentation, and recombining the condensed aromatics with the fermented cider after all fermentation has ceased.

8. The process of making cider vinegar comprising expressing cider from apples, distilling off from 1% to 5% of the volume of the cider to remove the aromatics therefrom, subjecting the remaining cider to alcoholic fermentation, then subjecting it to acetic fermentation, and recombining said aromatics with the fermented cider after fermentation has ceased.

9. The process of making cider vinegar comprising expressing cider from apples, distilling the aromatics from the cider under mild heat conditions such as not to break down the aromatics, subjecting the remaining cider to alcoholic fermentation, then subjecting it to acetic fermentation, and recombining said aromatics with the fermented cider after fermentation has ceased.

10. The process of making cider vinegar comprising expressing cider from apples, subjecting the cider to a flash distillation to remove the aromatics therefrom, subjecting the remaining cider to alcoholic fermentation, then subjecting it to acetic fermentation, and recombining said aromatics with the fermented cider after fermentation has ceased.

11. The process of making an alcoholic beverage having the bouquet of a fresh fruit juice comprising expressing the juice from fruit, distilling the aromatics from the juice, subjecting the remaining juice to alcoholic fermentation, and recombining the aromatics distilled off with the fermented juice after fermentation has ceased.

12. The process of making an alcoholic beverage having the bouquet of a fresh fruit juice comprising expressing the juice from fruit, distilling the aromatics from the juice, condensing said aromatics, subjecting the remaining juice to alcoholic fermentation, and recombining the condensed aromatics with the fermented juice after fermentation has ceased.

13. The process of making an alcoholic beverage having the bouquet of a fresh fruit juice comprising expressing the juice from fruit, distilling off from 1% to 5% of the volume of the juice to remove the aromatics therefrom, subjecting the remaining juice to alcoholic fermentation, and recombining said aromatics with the fermented juice after fermentation has ceased.

14. The process of making an alcoholic beverage having the bouquet of a fresh fruit juice comprising expressing the juice from fruit, distilling the aromatics from the juice under mild heat conditions such as not to break down the aromatics, subjecting the remaining juice to alcoholic fermentation, and recombining said aromatics with the fermented juice after fermentation has ceased.

15. The process of making an alcoholic beverage having the bouquet of a fresh fruit juice comprising expressing the juice from fruit, subjecting the juice to a flash distillation to remove the aromatics therefrom, subjecting the remaining juice to alcoholic fermentation, and recombining said aromatics with the fermented juice after fermentation has ceased.

16. The process of making an alcoholic beverage having the bouquet of a fresh fruit juice comprising expressing the juice from fruit, distilling the aromatics from the juice, subjecting the remaining juice to alcoholic fermentation, distilling the fermented juice, and recombining the said aromatics with the condensate from the last-mentioned distilling operation.

17. The process of making an alcoholic beverage having the bouquet of a fresh fruit juice comprising expressing the juice from fruit, distilling the aromatics from the juice, condensing said aromatics, subjecting the remaining juice to alcoholic fermentation, distilling the fermented juice, and recombining the condensed aromatics with the condensate from the last-mentioned distilling operation.

WILLIAM A. ROOKER.

REFERENCES CITED

The following references are of record in the file of this patent:

UNITED STATES PATENTS

| Number | Name | Date |
| --- | --- | --- |
| 2,153,849 | Speas | Apr. 11, 1939 |
| 156,802 | Lawrence | Nov. 10, 1874 |
| 190,801 | Whiting | May 15, 1877 |
| 2,224,059 | Mostny | Dec. 3, 1940 |
| 1,189,127 | Kellogg | June 27, 1916 |
| 536,888 | Nickols | Apr. 2, 1895 |

FOREIGN PATENTS

| Number | Country | Date |
| --- | --- | --- |
| 8,132 | Br. | 1884 |

OTHER REFERENCES

Milleville et al., "Apple Flavor" Food Packer, Nov. 1944, pp. 33, 34, 35, 50, and 51.

Tressler et al., Fruit & Vegetable Juices, The Avi Pub. Co., Inc., N. Y., 1939, page 371.

Brannt, Vinegar, Acetates, Cider, Etc., Baird & Co., Phila., 1890, pp. 169, 170, 173.